United States Patent
Wicks et al.

(10) Patent No.: US 7,916,068 B2
(45) Date of Patent: Mar. 29, 2011

(54) GENERALIZED INNER PRODUCT METHOD AND APPARATUS FOR IMPROVED DETECTION AND DISCRIMINATION

(75) Inventors: Michael C. Wicks, Utica, NY (US); Yuhong Zhang, Jamesville, NY (US)

(73) Assignee: The United States of America as represented by the Secretary of the Air Force, Washington, DC (US)

(*) Notice: Subject to any disclaimer, the term of this patent is extended or adjusted under 35 U.S.C. 154(b) by 63 days.

(21) Appl. No.: 12/584,590

(22) Filed: Aug. 25, 2009

(65) Prior Publication Data

US 2010/0245157 A1 Sep. 30, 2010

Related U.S. Application Data

(60) Provisional application No. 61/211,478, filed on Mar. 30, 2009.

(51) Int. Cl.
*G01S 13/62* (2006.01)
(52) U.S. Cl. .......... 342/162; 342/25 B; 342/90; 342/109; 342/115; 342/116; 342/192; 342/196
(58) Field of Classification Search .......... 342/159–162, 342/25 B, 25 D, 90, 109–112, 115–116, 192, 342/196
See application file for complete search history.

(56) References Cited

U.S. PATENT DOCUMENTS

| | | | | |
|---|---|---|---|---|
| 4,079,377 A * | 3/1978 | zur Heiden et al. | ........... | 342/109 |
| 4,106,019 A * | 8/1978 | Alexander et al. | ........... | 342/108 |
| 4,173,017 A * | 10/1979 | Burlage et al. | ........... | 342/162 |
| 4,176,351 A * | 11/1979 | DeVita et al. | ........... | 342/111 |
| 4,524,358 A * | 6/1985 | Bergman et al. | ........... | 342/162 |
| 5,657,022 A * | 8/1997 | Van Etten et al. | ........... | 342/104 |
| 5,748,143 A * | 5/1998 | Melvin et al. | ........... | 342/162 |
| 5,818,383 A * | 10/1998 | Stockburger et al. | ........... | 342/109 |
| 6,400,306 B1 * | 6/2002 | Nohara et al. | ........... | 342/25 R |
| 6,577,265 B2 * | 6/2003 | Dalton et al. | ........... | 342/26 R |
| 6,982,668 B1 * | 1/2006 | Doerry et al. | ........... | 342/160 |
| 2003/0189512 A1 * | 10/2003 | Chen et al. | ........... | 342/160 |
| 2010/0245157 A1 * | 9/2010 | Wicks et al. | ........... | 342/162 |

OTHER PUBLICATIONS

Airborne GMTI radar position bias estimation using static-rotator targets of opportunity ,Bar-Shalom, Y.; Aerospace and Electronic Systems, IEEE Transactions on vol. 37 , Issue: 2 Publication Year: 2001 , pp. 695-699.*

* cited by examiner

*Primary Examiner* — John B Sotomayor
(74) *Attorney, Agent, or Firm* — Joseph A. Mancini

(57) ABSTRACT

Method and apparatus for improving the detection and discrimination of slow moving or stationary range-Doppler spread objects on or in close proximity to the ground (or sea surface). Invention detects, discriminates and separates radar returns from interference including ground clutter discretes via a coherent process for separating target returns from the myriad of received signals. Thus the method and apparatus improves the probability of detecting and declaring the presence or absence of an object at the same time that the probability of false declaration decreases. The method and apparatus may be applied to the processing of any over resolved object, including airborne radar.

20 Claims, 16 Drawing Sheets

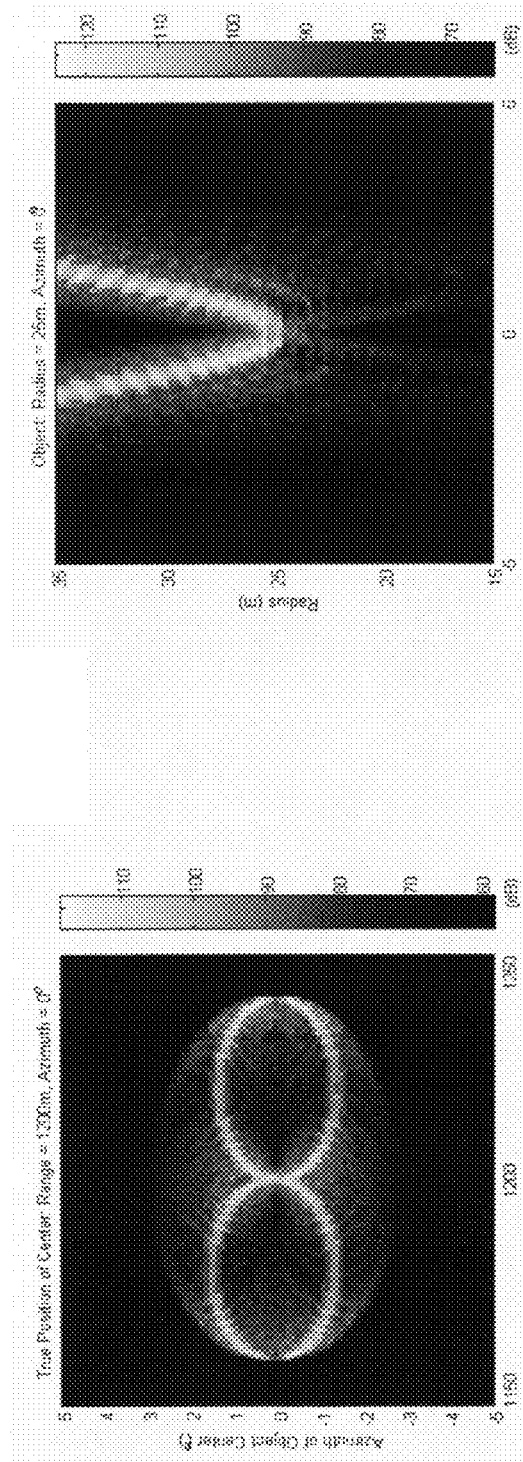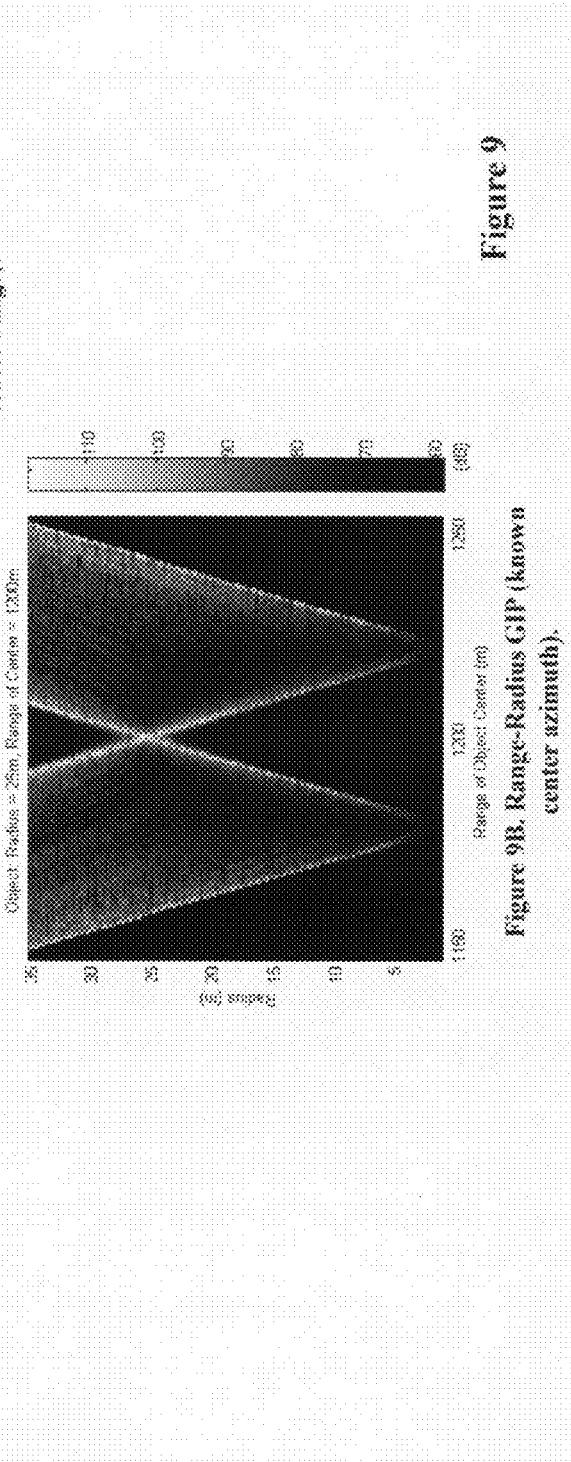
Figure 9

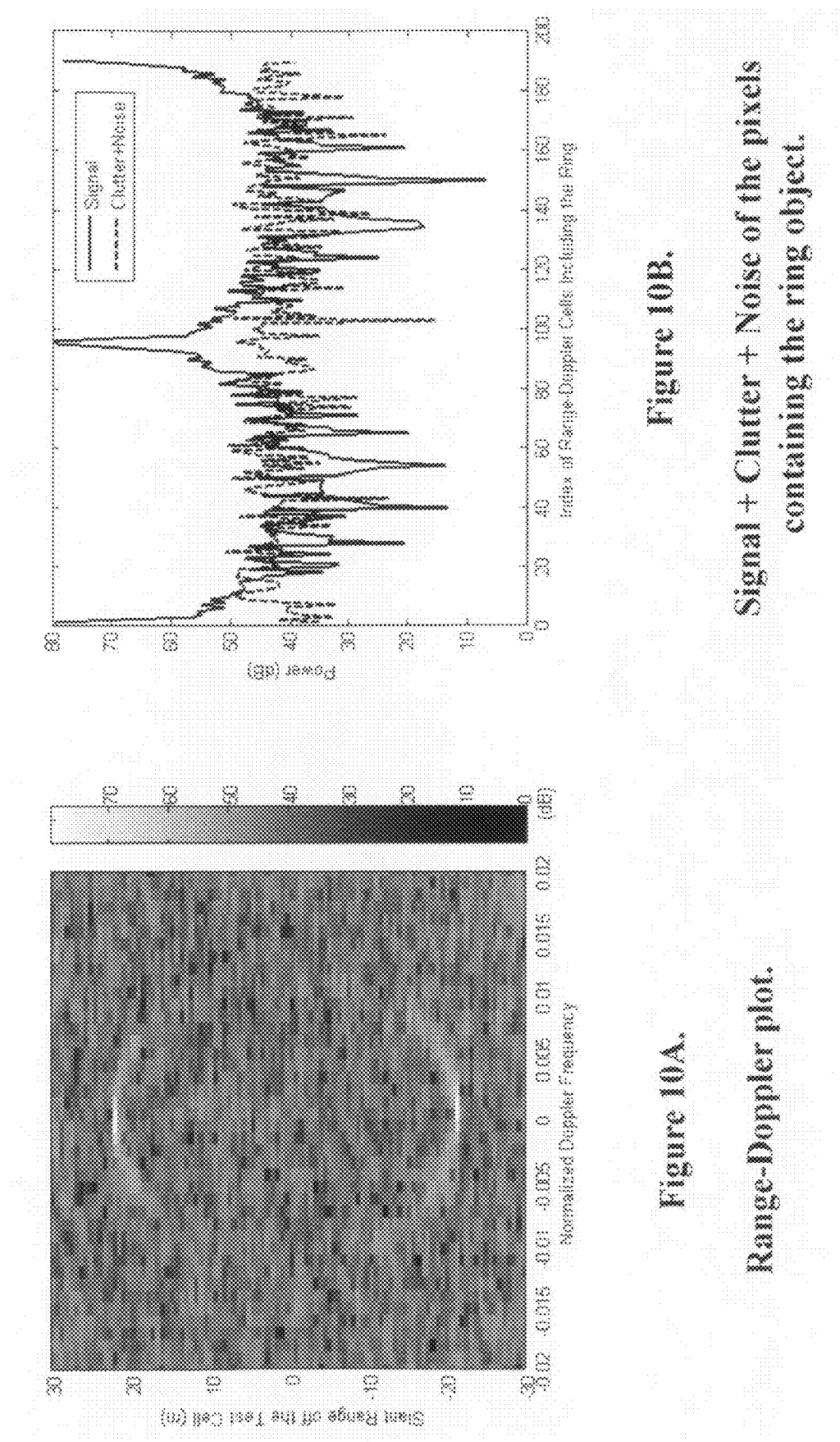
Figure 10A. Range-Doppler plot.
Figure 10B. Signal + Clutter + Noise of the pixels containing the ring object.

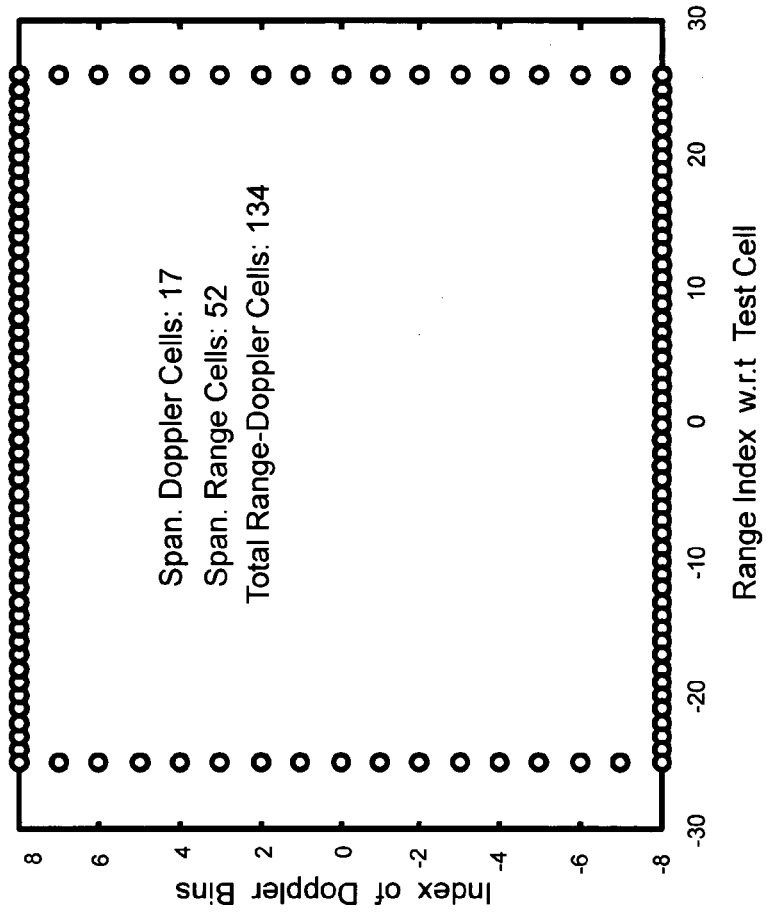
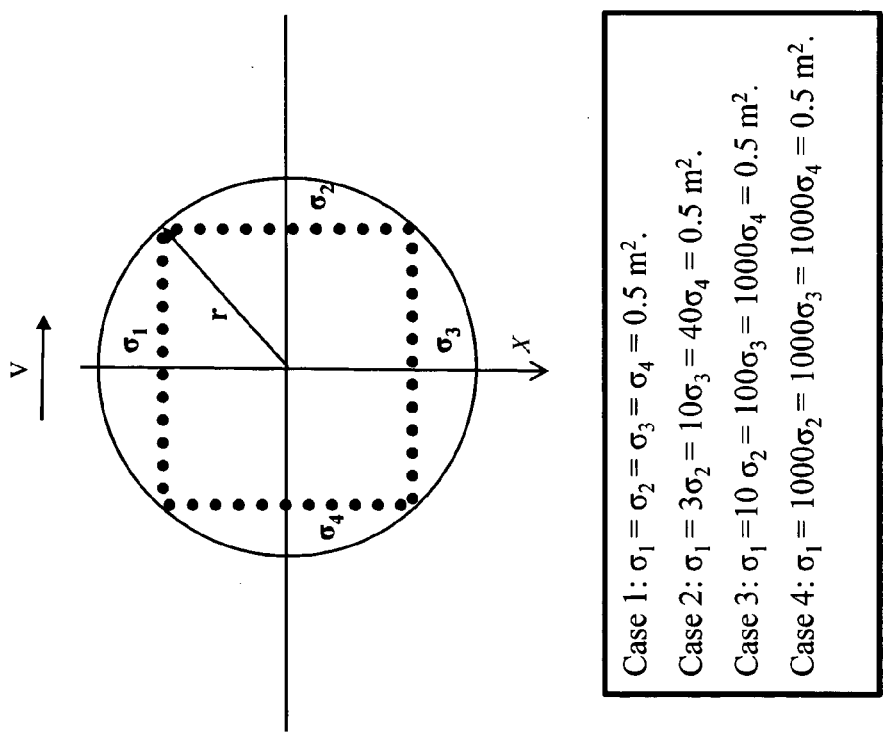
Figure 15

GENERALIZED INNER PRODUCT METHOD AND APPARATUS FOR IMPROVED DETECTION AND DISCRIMINATION

PRIORITY CLAIM UNDER 35 U.S.C. §119(e)

This patent application claims the priority benefit of the filing date of a provisional application Ser. No. 61/211,478, filed in the United States Patent and Trademark Office on Mar. 30, 2009.

STATEMENT OF GOVERNMENT INTEREST

The invention described herein may be manufactured and used by or for the Government for governmental purposes without the payment of any royalty thereon.

BACKGROUND OF THE INVENTION

A stationary or slow moving object or objects has a similar spectral nature as the surface clutter from its location. Traditionally, it can only be detected by a moving platform radar (airborne, space-based radar, for example) if their returns sufficiently exceed those from the ground (clutter). This requires that its cross-section exceed that of the competing clutter patch established by the range and cross-range resolutions of the radar. In other words, the signal-to-clutter-plus-noise ratio (SCNR) must be significantly greater than zero dB. To recognize an extended target, this requires the SCNR must be high enough in sufficiently many resolution cells. For point targets, the clutter cell size can be reduced arbitrarily, limited only by the performance limits of the radar. For extended targets the object size limits the reduction of the resolution cell for detection processing without over resolving the target.

Of course, both the object and clutter patch may be resolved using wide bandwidth synthetic aperture radar (SAR) processing. This results in an image where some returns from the resolved components of the doubly spread target may exceed those of their respective clutter patch. An "over-resolved" target is defined as one in which the target signal spreads over multiple resolution cells in the range dimension, the Doppler dimension, or n both dimensions. An image is formed and a detection declaration is made by an analyst via a non-coherent, albeit cognitive, process. This imaging process also supports target discrimination. There is no guarantee that the resolution for one section of the extended target is appropriate for other sections and the detection-in-clutter process may not be optimum. For the same reason, the SCNR in each cell may not be optimized for the discrimination process. Even more important, these processes require a man-in-the-loop causing significant delay in the availability of detection declarations while requiring significant communication assets.

Future sensing will be accomplished via unmanned vehicles with limited communications capability. This will require accomplishing the full surveillance mission (detection, track, classification) autonomously.

A technique is proposed to achieve significantly better detection and discrimination for extended targets in clutter. This technique is based upon a generalized inner product (GIP) based approach to data analysis. The GIP was also applied in signal processing to improve the performance of adaptive radars operating in non-homogeneous clutter, by employing multiple templates on limited knowledge of the targets of interest.

The apparatus consists of multiple, iterative GIP analyses, resulting in an improved estimate of the target parameters. It can provide autonomous detection, parameter estimation and discrimination of an extended complex target in colored noise and inhomogeneous clutter.

REFERENCES

[1] Barton, D. K., "Land clutter models for radar design and analysis," Proc. IEEE, vol. 73, no. 3, pp. 198-204, March 1985.

OBJECTS AND SUMMARY OF THE INVENTION

The objective of this invention is to provide a method and apparatus for detecting and discriminating among stationary or slowly moving objects, whose echoes are doubly spread over multiple range-Doppler cells, from strong surface clutter via a moving platform radar.

The present invention relates generally to sensor signal processing. It relates to detection and discrimination of targets by active sensors (radar, laser radar, sonar). In particular, it relates to this processing for targets that are 'spread,' that is, to systems that can resolve the targets in the range dimension, the Doppler dimension or in both dimensions. The invention employs a combination of radar hardware, computer hardware, and computer software comprising computer-implementable instructions.

The sensor detection process consists of deciding whether the output of the sensor receiver is due to noise and clutter only, or to a target return plus noise and clutter. For non-spread targets, this process consists of optimized clutter rejection followed by a process that determines whether a signal crosses a predetermined threshold level. For spread targets (resolved in range, Doppler or both) the process is more complex since there are multiple outputs of the sensor receiver to consider in the thresholding processing.

The sensor declaration process consists of determining the type of target that is causing a particular return and of estimating that target's parameters (location and size in various dimensions). This process is accomplished in image analysis either by a human analyst or by computer-based processing that emulates the capability of the analyst. In either case the multiple returns from the spread target are considered separately and then combined non-coherently.

Briefly stated, the present invention discloses an apparatus and method for detection and declaration processing of spread targets in sensor systems of the various types. The invention employs GIP-based processing which coherently combines the multiple returns from the spread target and adaptively rejects interference, including jamming and clutter. Thus the subject apparatus and method improves the probability of detecting the presence (or absence) of a spread target while at the same time it improves the estimation of the parameters of the target. This GIP-based processing can be applied to single-receiver channel systems, multiple spatial channel systems, multiple polarization channel systems or systems with multiple spatial and polarization channels.

The present invention greatly improves the detection process for active sensors viewing spread targets. The returns from a spread target appear in multiple range, Doppler and/or range-Doppler bins. This GIP-based processing maximizes the signal return by combining these multiple returns coherently while simultaneously using multiple system channels (spatial, polarization), if available, to optimally reject interference. The resulting SCNR is significantly better than that of each resolution cell separately and significantly better than that of these cells combined non-coherently, as currently implemented in modern synthetic aperture radar systems.

The present invention also greatly improves the declaration process for these same sensors viewing these same spread targets. Coherent integration insures that the impact of adding each return from each resolution cell is maximized, thus insuring optimum detection across the various components of the spread target and optimum estimation of the target extent in its various dimensions.

BRIEF DESCRIPTION OF THE DRAWINGS

FIG. 9A depicts the range-azimuth GIP for a circular target with a known radius.

FIG. 9B depicts the range-radius GIP for a circular target with a known center azimuth (azimuth of the center of the circular target).

FIG. 9C depicts the azimuth-radius GIP for a circular target with a known center range (range to the center of the circular target).

FIG. 10A shows the traditional range-Doppler image of the circular object embedded in clutter and noise.

FIG. 10B shows the signal and clutter plus noise of the pixels containing the ring object.

FIG. 15A shows four example cases for a square-shaped object that consists of uniformly distributed discretes and can be inscribed in a circle of radius r=25 m.

FIG. 15B shows in detail the range-Doppler cells including the square object.

DETAILED DESCRIPTION OF THE PREFERRED EMBODIMENT

Figure 1:
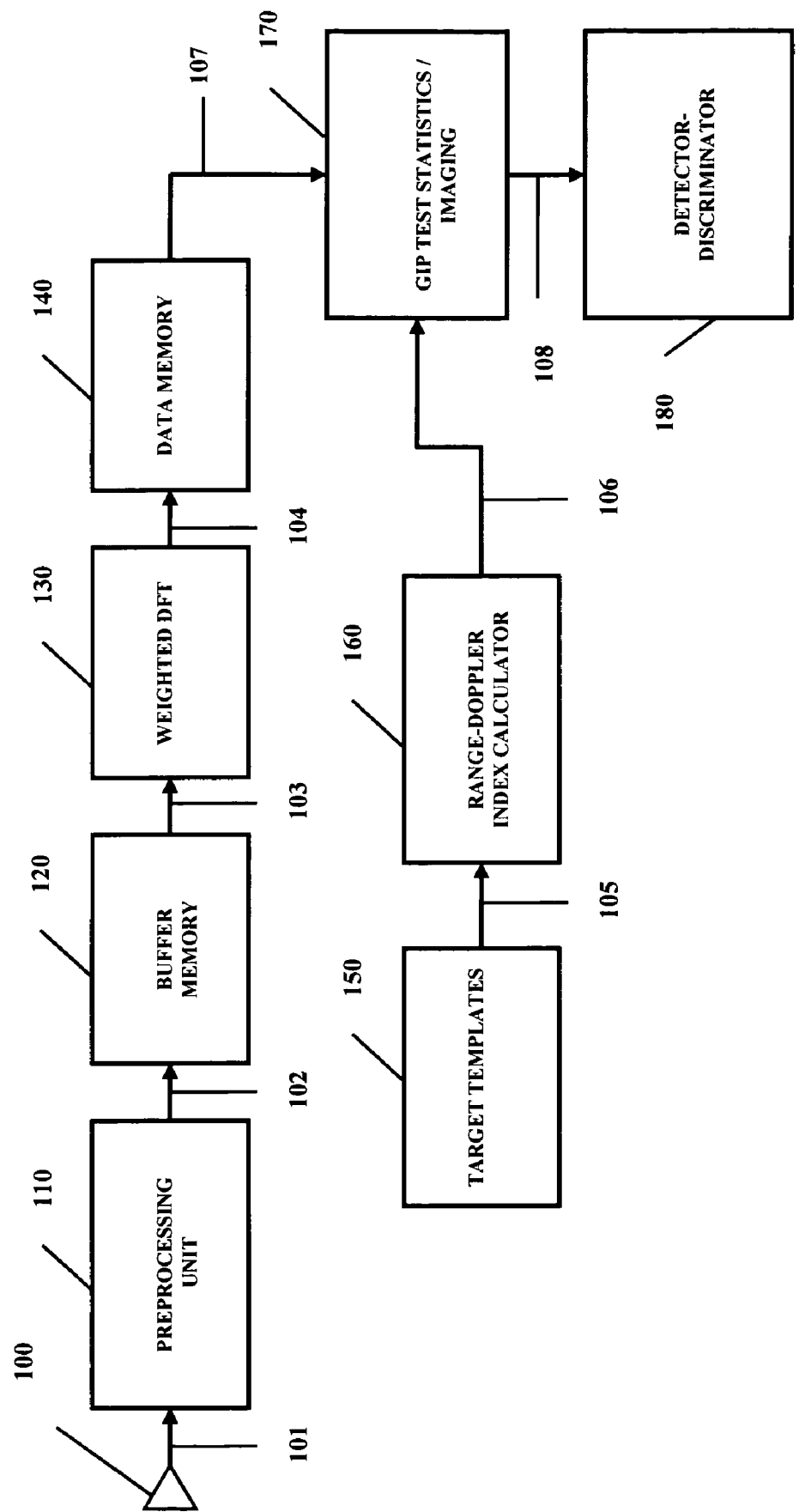
FIG. 1 depicts the simplified block diagram of the GIP detector and discriminator.

The objective of the present invention and its GIP-based detector and discriminator is to achieve significantly better detection and discrimination for doubly spread targets in the presence of strong surface clutter. Referring to FIG. 1 shows a simplified block diagram for the GIP detector and discriminator of the present invention. An analog radar signal 101 arrives at the receive channel 100. A preprocessing unit 110 receives the analog radar signal 101, converts it to an intermediate frequency ("IF"), digitally samples them in analog-to-digital converters, and applies traditional radar signal processing to yield baseband frequency, complex-valued, digital in-phase-and-quadrature ("IQ") radar signal samples 102 that correspond to each range cell for each transmitted pulse (range-pulse data). The preprocessing unit 110 also incorporates the digital pulse compression operation, if applicable. The range-pulse data recorded in one coherent processing interval (CPI) are transferred to a buffer memory 120. One skilled in the art will appreciate that the present invention can be comprised of a combination of dedicated radar hardware components, signal processing components, and computer hardware and software, where the software comprises computer-implementable instructions stored on a suitable computer-readable medium.

Radar signal samples at the $k^{th}$ range cell and $n^{th}$ pulse are denoted as $x_k(n)$ for $n=1, 2, \ldots N$ and $k=1, 2, \ldots K$, where N is the number of pulses in one CPI and K is the number of range cells of interest. The preprocessed and buffered received radar signal 103 includes target and clutter returns, together with additive uncorrelated interference called noise. Clutter returns are a correlated form of interference. Mathematically, the received radar signal at the $n^{th}$ sampling time instant can be expressed as $$x_k(n) = t_k(n) + c_k(n) + n_k(n), n=1, 2, \ldots N,$$

where $\{t_k(n)\}$, $\{c_k(n)\}$, and $\{n_k(n)\}$ denote the target signal, surface (ground or sea) clutter, and noise components, respectively. Both clutter and noise are assumed to be stationary, ergodic, zero-mean, Gaussian stochastic processes, and independent of each other. The radar signal can be rewritten in vector form:

$$x_k = t_k + c_k + n_k,$$

where $$x_k = \begin{bmatrix} x_k(1) \\ x_k(2) \\ \vdots \\ x_k(N) \end{bmatrix},$$

-continued $$t_k = \begin{bmatrix} t_k(1) \\ t_k(2) \\ \vdots \\ t_k(N) \end{bmatrix},$$

$$c_k = \begin{bmatrix} c_k(1) \\ c_k(2) \\ \vdots \\ c_k(N) \end{bmatrix},$$

and $$n_k = \begin{bmatrix} n_k(1) \\ n_k(2) \\ \vdots \\ n_k(N) \end{bmatrix}$$

are N×1 vectors. Thus, the range-pulse data received in one CPI for K range cells can be expressed in matrix form as $$X=[x_1 \ x_2 \ \ldots \ x_K].$$

The range-pulse data matrix X has a dimension of N×K and is also stored in buffer memory 120.

Given an observation data matrix X, the radar detection problem is reduced to choosing one of the following two hypotheses:

$H_0$: X=C+N, target absent
$H_1$: X=T+C+N, target present
where T=[$t_1 \ t_2 \ \ldots \ t_K$], C=[$c_1 \ c_2 \ \ldots \ c_K$], and N=[$c_1 \ c_2 \ \ldots \ c_K$] are N×K matrices.

A discrete Fourier transform with a low sidelobe window (weighted DFT) 130 is applied to the signal samples of the preprocessed and buffered received radar signal 103 for each range cell, which converts the range-pulse data matrix to a range-Doppler data matrix 104:

$$X_f = F(X) = \begin{bmatrix} x_f(1,1) & x_f(1,2) & \ldots & x_f(1,K) \\ x_f(2,1) & x_f(2,2) & \ldots & x_f(2,K) \\ \vdots & \vdots & \ddots & \vdots \\ x_f(N,1) & x_f(N,2) & \ldots & x_f(N,K) \end{bmatrix},$$

where F(•) denotes the column-by-column weighted DFT, and the indices (n, k) in x(n, k) denote the $n^{th}$ Doppler cell and the $k^{th}$ range cell, respectively. The range-Doppler data matrix includes K×N range-Doppler cells and is stored in data memory 140. Similarly, we can respectively express the component matrices as $T_f=F(T), C_f=F(C),$ and $N_f=F(N)$ The low sidelobe window (weighted DFT) 130 may be a Chebyshev-type low sidelobe window.

In the range-Doppler data matrix, clutter (and noise) could appear in all of these range-Doppler cells, while the target of interest usually appears in a very limited number of cells, determined by its range-Doppler trace.

Figure 2B:
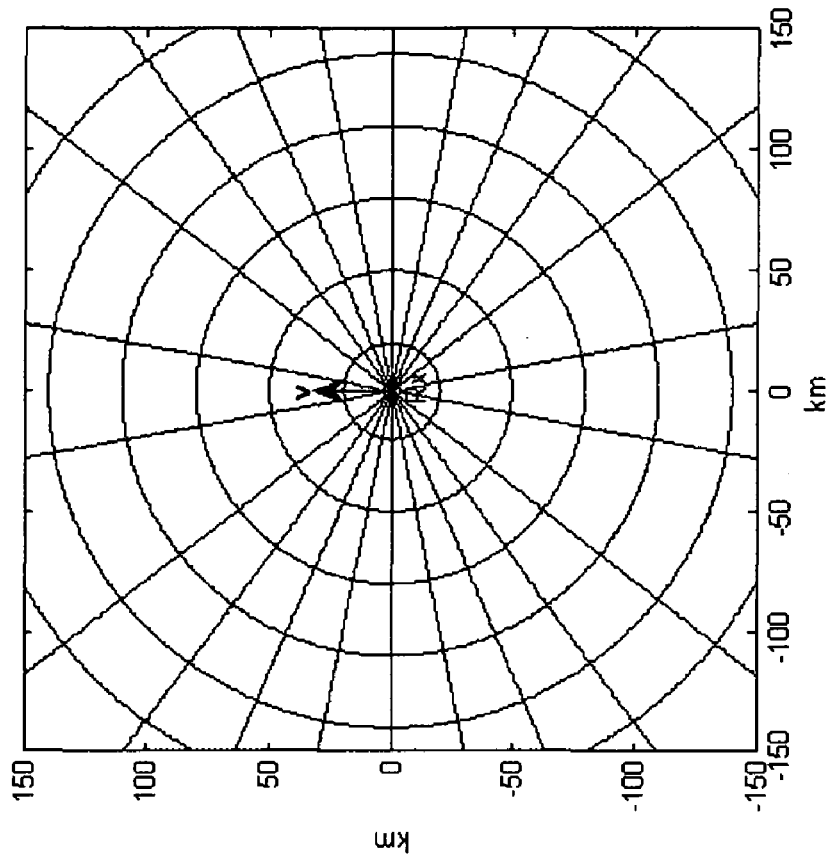
FIG. 2B shows the iso-range (rings) and iso-dop (hyperbolas) contours for an airborne radar.
Figure 2A:
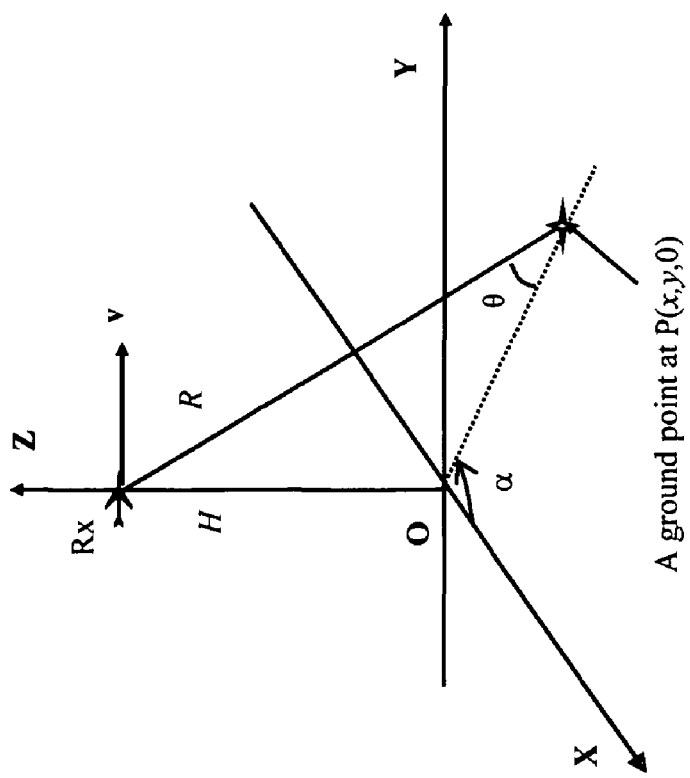
FIG. 2A draws the reference coordinate system.

Referring now to FIG. 2 illustrates an example that depicts the iso-range (rings) and iso-dop (iso-doppler, hyperbolas) contours for the surface clutter (FIG. 2B) in the defined coordinate system (FIG. 2A), where the XOY plane is at the surface of the ground (assumed to be flat) with the origin at the nadir point of the radar Rx, which is flying level at altitude H. The radar velocity vector v (speed=$V_R$) is parallel to the Y-axis.

The Doppler frequency for a stationary scatterer located at point P (x, y, 0) on the earth's surface can be expressed as $$f_c = \frac{2V_R}{\lambda}\cos\theta\sin\alpha$$
$$= \frac{2V_R\sqrt{R^2 - H^2}}{\lambda R}\sin\alpha,$$

where R denotes the slant range, θ is the depression (grazing) angle, and α is the azimuth angle, counterclockwise, starting from the X-axis, i.e., the broadside. Therefore, there is a "one-to one" mapping relationship between Doppler frequency and azimuth angle for a given range R. Surface clutter will spread over extended range-Doppler cells.

A key for the invention is to integrate the target power over as many range-Doppler cells as possible and suppress interfering clutter components. Therefore, the range-Doppler trace (indices) of a target in different orientations and at different locations are required.

For this purpose, (referring again to FIG. 1) a database of target templates including the shapes (structures) of targets of interest is required and pre-stored in memory 150. If the shape and size of a target is approximately known, a corresponding target template can be used to match the target. The database of target templates 150 also includes several or more standard templates for the cases that no or very little knowledge about the target is known. A general requirement for all templates is that it must be large enough so that the target range-Doppler spectrum spreads over multiple range-Doppler cells. Two standard templates are recognized: a circular ring for wire-type targets and a circular disk for planar targets. Here, an object is called wire-type if its section size is much smaller than the whole size such as wires or pipes. The planar targets are defined as two-dimensional extended objects.

The range-Doppler indices for each of the target templates 105 are calculated by the range-Doppler index calculator 160 in real-time or pre-calculated off-line and stored in the index calculator 160. The index calculator 160 produces the range-Doppler indices for the selected target template with each specified parameter set Θ={target parameters, radar parameters}. The target parameters usually include position (range, azimuth, etc.), size, orientation, and radial speed, if any, etc. The target position can be defined by a reference point (for example, the geographical center) on the target. The radar parameters include both the system and platform parameters such as radar wavelength, speed, altitude, etc. The set of range-Doppler indices 106 for the selected template will be used by the GIP test statistics/imaging subsystem 170 to select range-Doppler data 107. The GIP test statistics/imaging output 108 from the GIP test statistics/imaging subsystem 170 are passed to the detector/discriminator 180 to determine if a target exists and what its geometrical parameters are. It should be noted that the GIP test statistics may be replaced with other test statistics such as sample matrix inversion (SMI).

Figure 3:
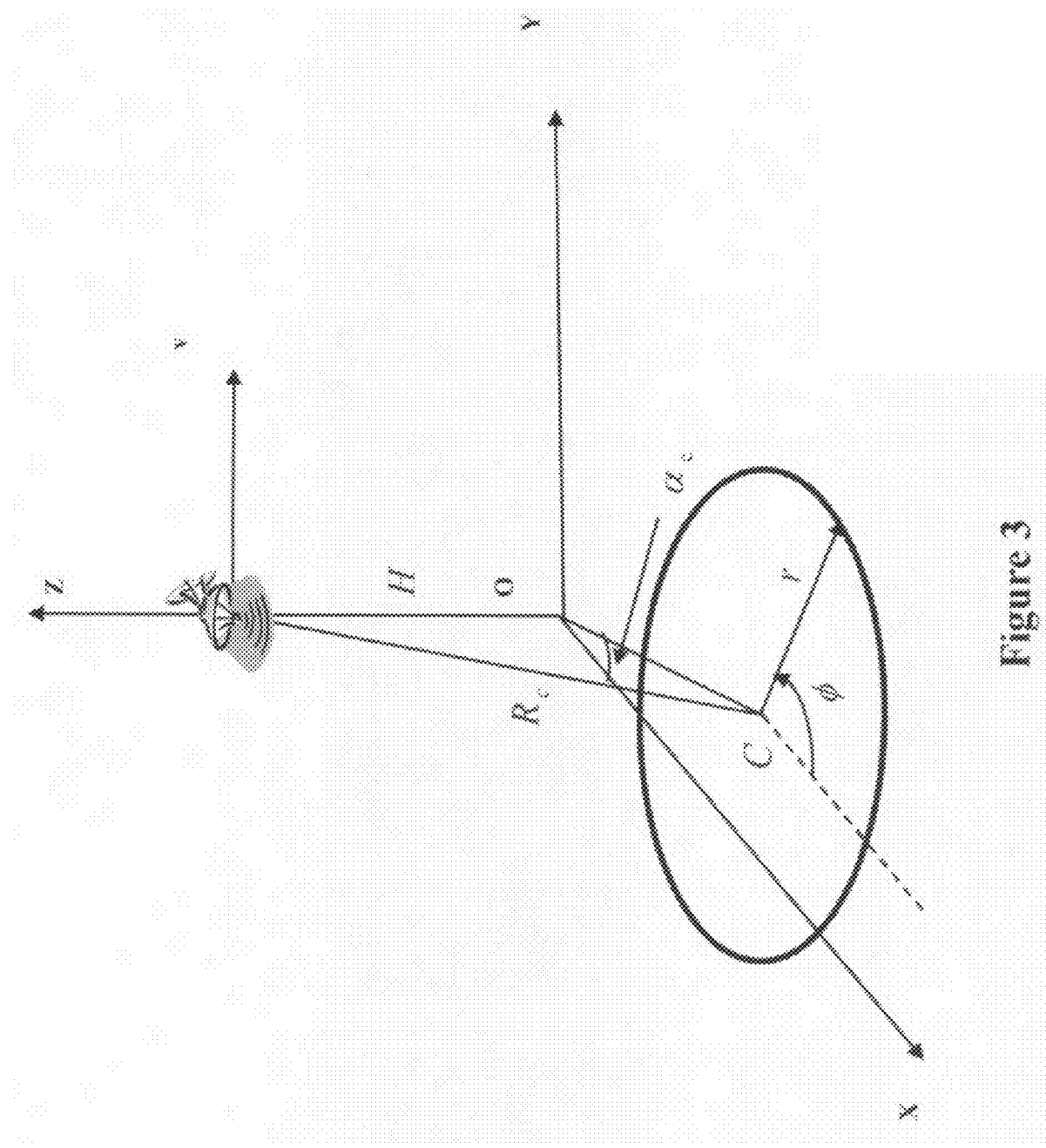
FIG. 3 shows the scenario for the calculation of the range-Doppler indices of a circular ring object on the ground.

Referring to FIG. 3, a stationary object on the ground has a spectral nature similar to the ground clutter from that location. In contrast to extended surface clutter, a wire-type object only appears in a limited number of range-Doppler cells, which is determined by its shape and location. FIG. 3 shows an example of a wire-type object on the ground, a circular-ring of radius r. The center of circle is at C($x_0$, $y_0$, 0), with $$\begin{cases} x_0 = \sqrt{R_c^2 - H^2} \cos\alpha_c \\ y_0 = \sqrt{R_c^2 - H^2} \sin\alpha_c \end{cases}$$

where $R_c$ is the radar slant range, and $\alpha_c$ is the azimuthal angle, measured from the X-axis counterclockwise.

The coordinates of the circular object can be described in the following parametric equations:

$$\begin{cases} x = x_0 + r\cos\phi \\ y = y_0 + r\sin\phi \text{ for } \phi = 0 \sim 2\pi \\ z = 0 \end{cases}$$

Figure 4B:
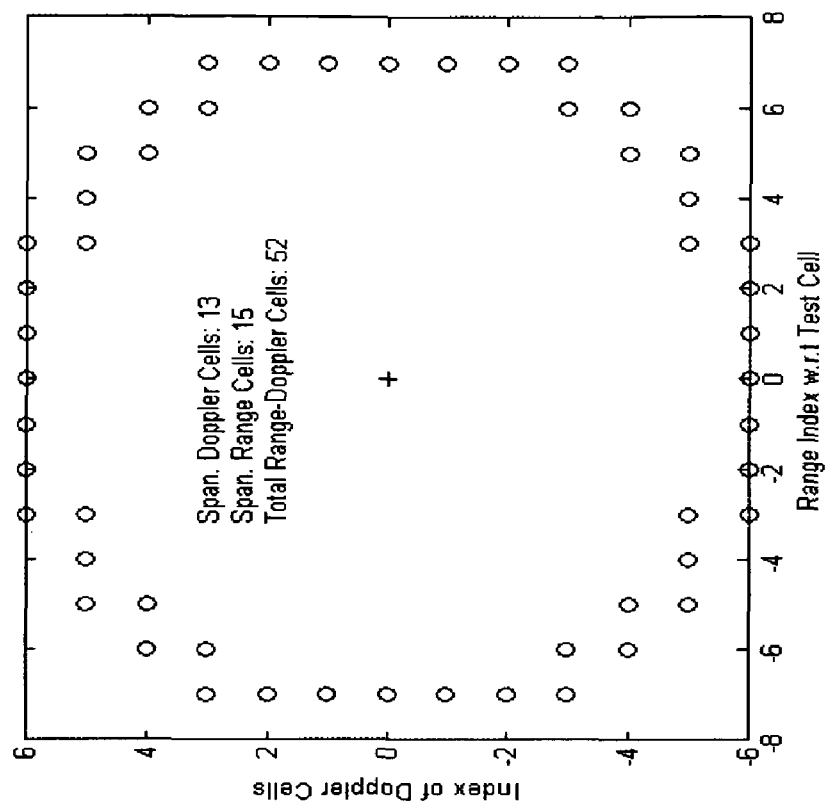
FIG. 4B shows in detail the range-Doppler cells at the edge of the circular object.
Figure 4A:
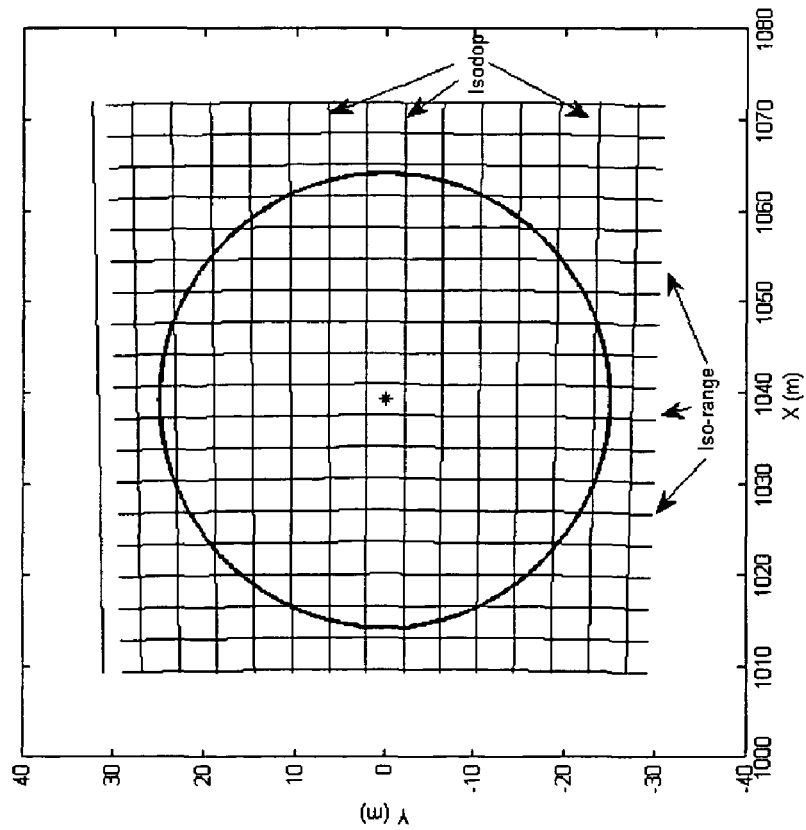
FIG. 4A shows the range-Doppler resolution cells around a circular object.

The corresponding Doppler frequency can be calculated using the previously given equation, with the azimuth angle being $\alpha = \tan^{-1}(y/x)$. The slant range from a point on the circular ring to the radar is $R = \sqrt{x^2 + y^2 + H^2}$. Thus, given the center location and radius, the range-Doppler trace of a circular ring can be completely determined. Referring to FIG. 4, FIG. 4A shows an example with the ring center located at R=1200 m broadside to an L-band airborne radar that is moving at a speed of 50 m/s, where the radar altitude is H=600 m. Then, the corresponding range-Doppler indices can be found by quantization, as shown in FIG. 4B where the range-Doppler resolution cells including the circular object are marked by the symbol "o". Assume that the range-Doppler trace of the target template spreads over $N^t$ range-Doppler cells with the corresponding indices being $(n_1^t, k_1^t), (n_2^t, k_2^t), \ldots, (n_{N^t}^t, k_{N^t}^t)$. Define the index set of the target template as $$\Omega_t = \{(n_1^t, k_1^t), (n_2^t, k_2^t), \ldots, (n_{N^t}^t, k_{N^t}^t)\}.$$

Obviously, $\Omega_t$ varies with the parameter set $\Theta$. These results can easily be applied to moving targets by shifting the Doppler indices according to the corresponding target Doppler frequency. Generally, the range-Doppler index set $\Omega_t$ can be calculated off-line for a set of specific parameters and used to select the range-Doppler entries from the stored range-Doppler data 107.

Figure 5:
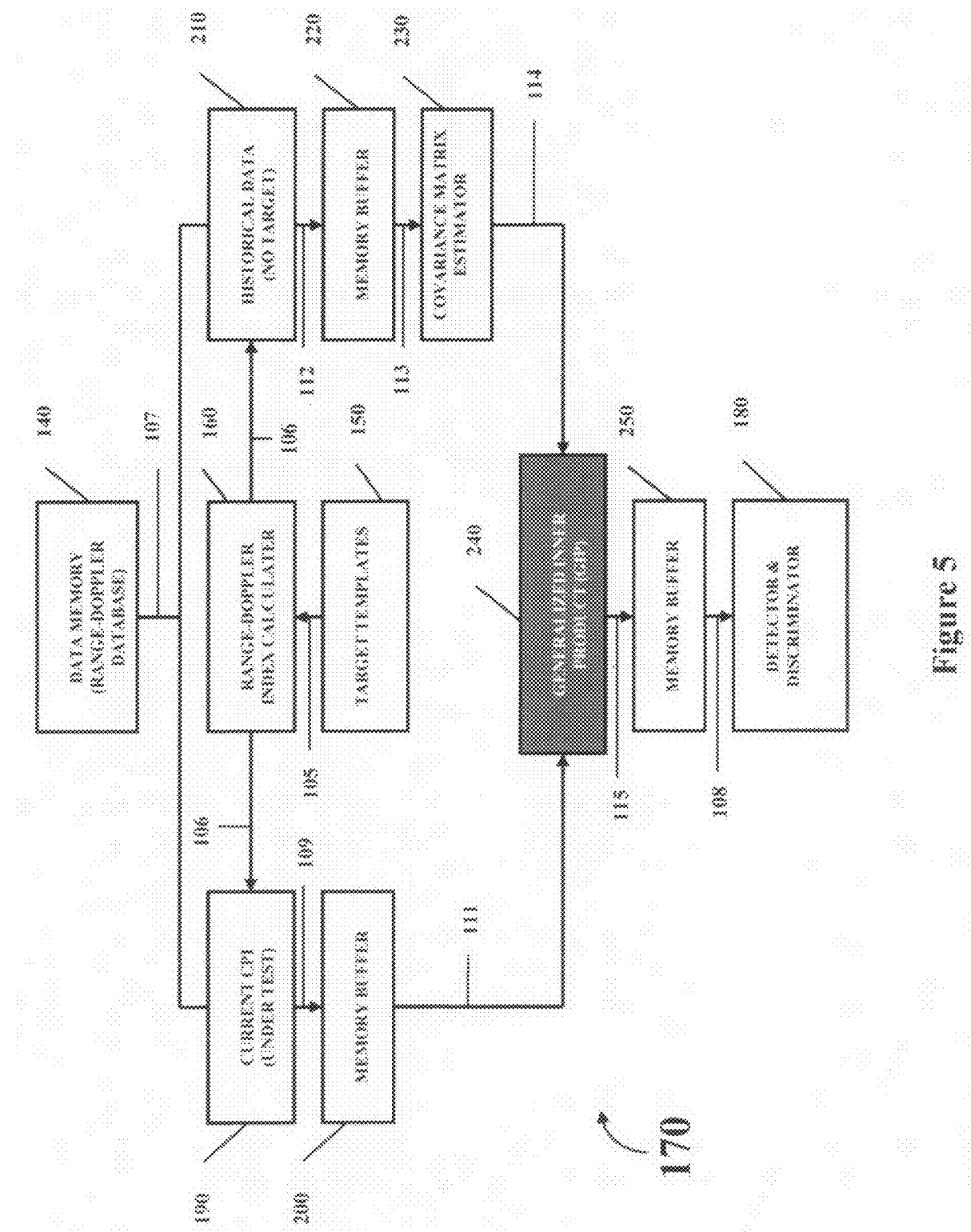
FIG. 5 shows the block diagram of the GIP test statistics/imaging subsystem.

FIG. 5 further shows the block diagram of the GIP test statistics/imaging subsystem 170 in detail. The data memory 140 holds the range-Doppler matrix for the current CPI 190 under test and historical range-Doppler data 210 from adjacent or previous CPI's during the flight, used for training (covariance estimation). The data vector under test 109 can be formed by extracting entries belonging to the index set $\Omega_t$ 106:

$$z_0 = \text{Vec}[\{x_j(n,k),(n,k)\in\Omega_t\}]$$

where Vec[•] denotes the vectorizing operation that leads to a column ($N^t \times 1$) vector. The formed test vector is stored in memory buffer 200.

The GIP test statistics can be expressed as $$\text{GIP} = z_0^H R^{-1} z_0$$

where $$R = E[z_0 z_0^H | H_0]$$

is the covariance matrix of the test data vector in the absence of a target.

In practice, the true covariance matrix of the test data vector is unknown and can usually be estimated from training data. Assume that we have M training data matrices $X_m$ for $m=1, 2, \ldots, M$. After the weighted DFT $X_{f_m} = F(X_m)$, we obtain the M range-Doppler training data matrices $X_{f_m} = F(X_m)$ for $m=1, 2, \ldots, M$. Extracting the entries belonging to the index set $\Omega_t$, M training data vectors 112 can be formed:

$$z_m = \text{Vec}[\{x_{f_m}(n,k),(n,k)\in\Omega_t\}], \text{ for } m=1, 2, \ldots, M$$

Assuming that all training data vectors 112 are Gaussian and independent, identically distributed (iid) with the covariance matrix R, the maximum-likelihood estimate of R can be expressed as $$\hat{R} = \frac{1}{M}\sum_{m=1}^{M} z_m z_m^H.$$

The GIP test statistics becomes $$\text{GIP} = z_0^H \hat{R}^{-1} z_0.$$

Still referring to FIG. 5, the training data matrices $\{X_m\}$ are obtained from historical range-Doppler data 210 selected from most adjacent, previous CPI's during flight in the absence of a target. The M training data vectors $\{z_m$ for $m=1, 2, \ldots, M\}$ 112 are selected with the index set $\Omega_t$ 106 and stored in memory buffer 220. The covariance matrix R is estimated in the following covariance matrix estimator 230. The estimated covariance matrix $\hat{R}$ 114 is used for the GIP 240 test computation for the selected test vector $z_0$ 111.

The parameter set $\Theta$ usually includes multiple unknowns. Thus, multiple one-dimensional GIP (curves) can be formed by varying any one parameter, and multiple two-dimensional GIP (images) can be formed by varying any two parameters. The resultant GIP curves/images can be used for the target detection and discrimination processing in the following detector and discriminator 180.

The GIP curves and images can be improved via an iterative process, particularly when no or very little knowledge about the target is known. In this case, the invention can start with a standard template and an initial set (by guessing) of parameters. Then, the invention forms one or more GIP curves and images and estimates some parameters from the resultant GIP curves/images. Next, the template is updated using the estimated parameters, and the process is repeated with the updated template. The GIP curves and images can be improved significantly via several iterations.

Simulation Results

A radar signal modeling and simulation tool was used to simulate the radar signals (target, clutter, and noise). In this example, the target is a conductive circular-shaped O-ring with radius r=25 m on the ground centered at $C(x_0, y_0, 0)$, as shown in FIG. 3. For modeling purposes, the object is divided into many small segments. Each segment is small enough so that it can be approximated by a circular tube or cylinder and the far-field conditions are met. An L-band radar (carrier frequency=1250 MHz) with a bandwidth of 250 MHz and pulse repetition frequency (PRF) of 750 Hz was modeled, with the average radiated power being 2 watts and 1024 pulses in one CPI. The platform altitude was 600 m and the platform velocity was 50 m/s. The clutter background was assumed to be farm land.

One-Dimensional GIP

Referring to FIG. 6, the shape of the target in this example is known in advance to be circular. Therefore, a circular template is used in the GIP test. The position and size of a ring-like target can be determined by three parameters: radius, azimuth $\alpha_c$, and slant range $R_c$. One-dimensional GIP is the test statistics output as a function of one unknown parameter, assuming the other two parameters are matched by the template.

Figure 6B:
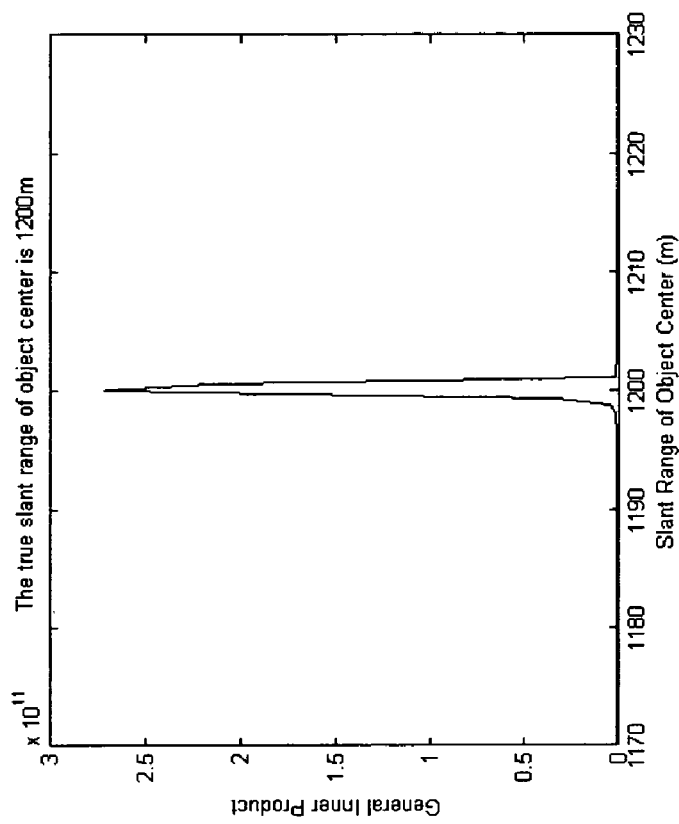
FIG. 6B plots the GIP as a function of slant range to the ring center on a linear scale.
Figure 6A:
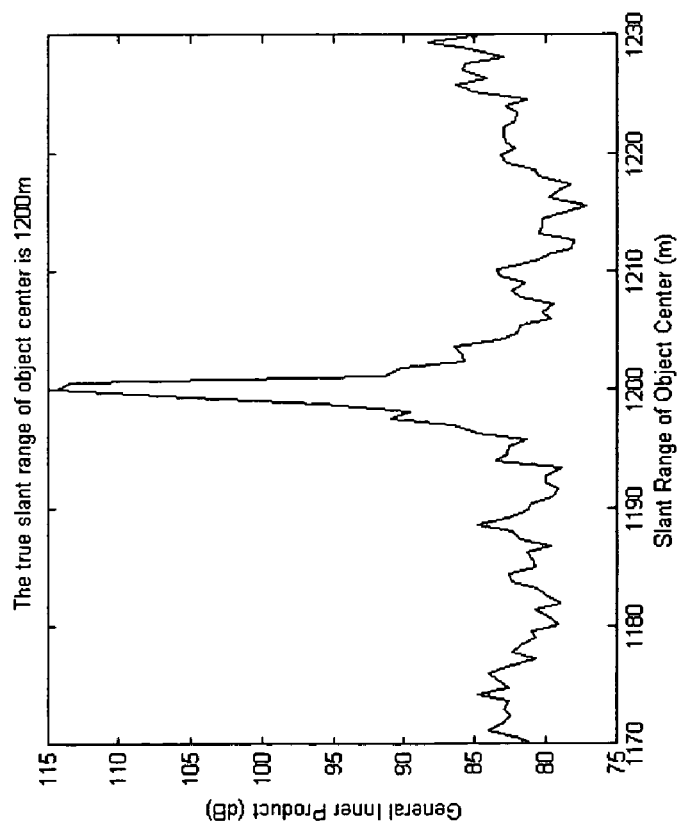
FIG. 6A plots the GIP as a function of slant range to the ring center on a logarithmic scale.

FIG. 6 shows the GIP output as a function of slant range on logarithmic (FIG. 6A) and linear (FIG. 6B) scales, respectively, assuming that the radius and azimuth of the template match those of the target. It is shown that the GIP peaks sharply at the true target range. This GIP test result is similar to the signal processing output in traditional radar, but the output SCNR in the GIP test is greatly improved because it coherently integrates across the target signal over many range-Doppler cells where the target is spread, and suppresses the ground clutter simultaneously.

Figure 7B:
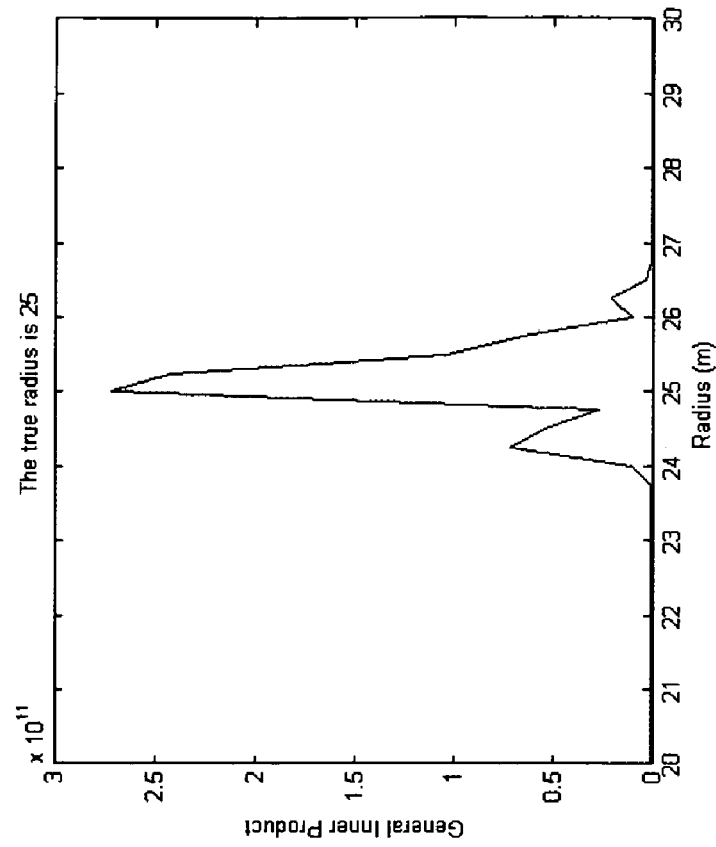
FIG. 7B plots the GIP as a function of radius on a linear scale.
Figure 7A:
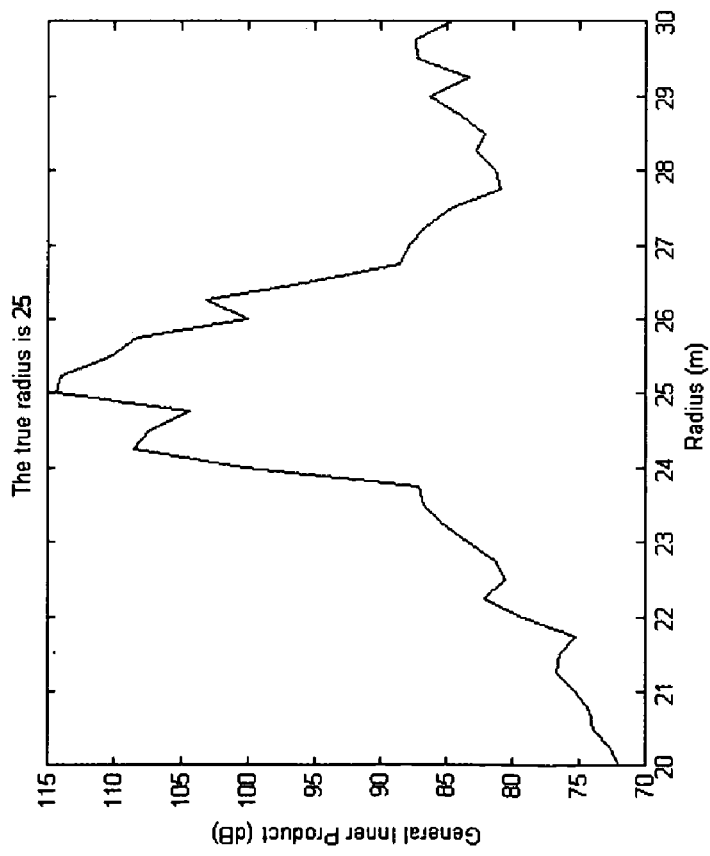
FIG. 7A plots the GIP as a function of radius on a logarithmic scale.

Referring to FIG. 7, the range and azimuth of the ring center in the template is assumed to match those of the target. FIG. 7 shows the corresponding GIP output, as a function of the radius of the ring on logarithmic (FIG. 7A) and linear (FIG. 7B) scales, respectively. The GIP output peaks when the radius in the template matches the true radius (r=25 m). The result shows that the GIP test can be used for estimating the shape/size of the target.

Figure 8B:
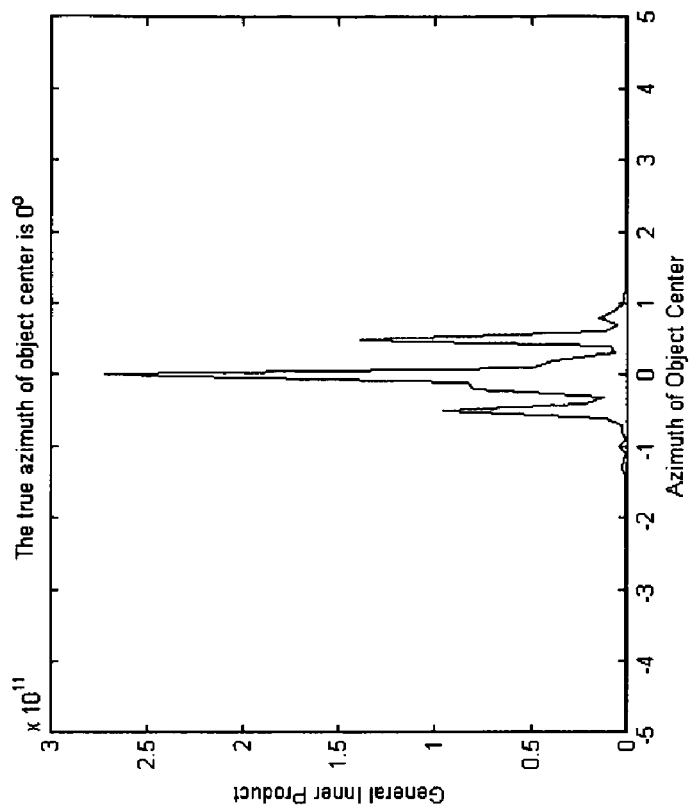
FIG. 8B plots the GIP as a function of azimuth to the ring center on a linear scale.
Figure 8A:
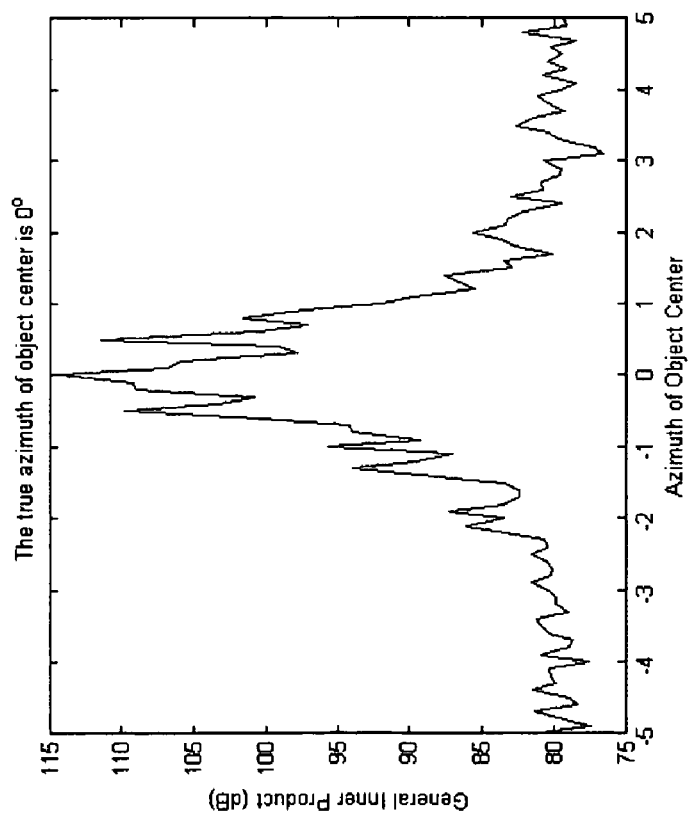
FIG. 8A plots the GIP as a function of azimuth to the ring center on a logarithmic scale.

FIG. 8 shows the GIP output as a function of azimuth angle of the ring center on logarithmic (FIG. 8A) and linear (FIG. 8B) scales, respectively, assuming that the radius of the circular template and its center range match the true values. The GIP also peaks at the true azimuth of the target. This result shows that the GIP test provides a potential high-resolution angular location technique for range-Doppler spread targets.

Two-Dimensional GIP

For the above circular target and template, one can form three different GIP images with one parameter given, as shown in FIG. 9 where that one parameter is exactly known. FIG. 9A depicts the range-azimuth GIP image when the radius in the template matches that of the target (r=25 m). As seen, the range-azimuth GIP image looks like two rings with a junction point at the true center of the circular. The GIP image is also symmetrical in relation to the true center position of the circular. The radius of the circle can be obtained from the ring size in the image by converting the slant range to the ground range. FIG. 9B depicts the range-radius GIP image when the true azimuth of the ring center is known (0°). The GIP image includes two thin (focused) V shaped images. The junction point is at the true range of the target center and true radius of the circular target. The bottom of the two V's is near r=0. FIG. 9C depicts the azimuth-radius GIP image when the true slant range of the ring center is known (at $R_c$=1200 m). The bottom of the "V" shaped GIP image is at the true radius and azimuth.

Because range and azimuth are the two most important parameters in radar and other sensor systems, and the range-azimuth GIP image directly displays the range and azimuth and shape/size parameters of the target, the range-azimuth GIP image is considered as the primary two-dimensional GIP test statistics, while the other two GIP images may be used as secondary or auxiliary tools for parameter estimation and/or verification.

For comparison with FIG. 9, FIG. 10A shows the traditional range-Doppler image for the same circular object embedded in clutter and noise. FIG. 10B compares the signal and clutter plus noise of the pixels containing the ring object.

Figures 11, 11A, 11B:
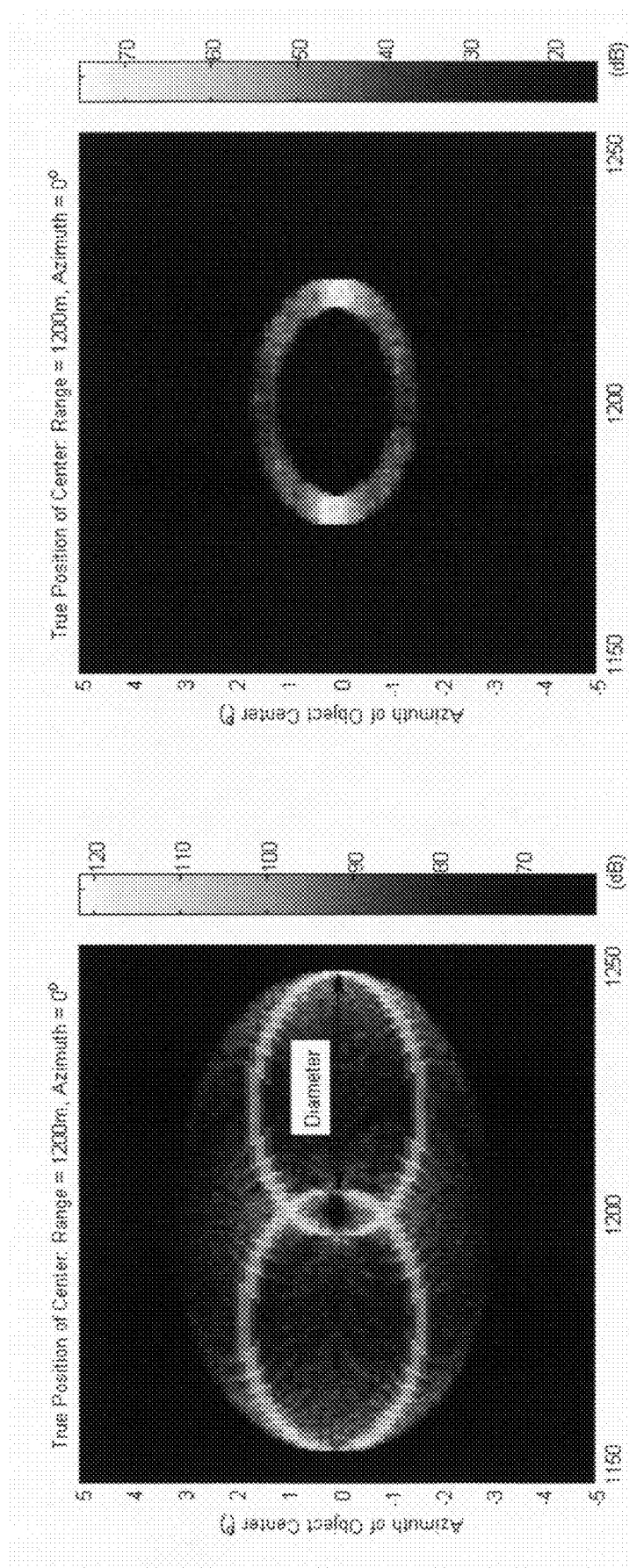
FIG. 11A shows the range-azimuth GIP when the template radius is 30 m, 5 m greater than the true radius.
FIG. 11B shows the range-azimuth GIP when the template radius is 2.5 m, one tenth of the true radius.

FIG. 11 depicts range-azimuth GIP images when the radius of the template is mismatched to that of the target. FIG. 11A shows the GIP image when the radius of the template is 30 m (5 m greater than the true target radius of r=25 m). The GIP image includes two overlapping rings located symmetrically about the true position of the ring center. After the image is converted from slant range to ground range, the diameter of the object can be directly obtained from the image, as illustrated in the figure. FIG. 11B shows the range-azimuth GIP image when the template is much smaller in size than that of the true target. Here, the radius in the template is 2.5 m, one-tenth of the true radius. In this case, the range-azimuth GIP image displays the true position of the target center and its rough shape.

Target Discrimination

Figure 12B:
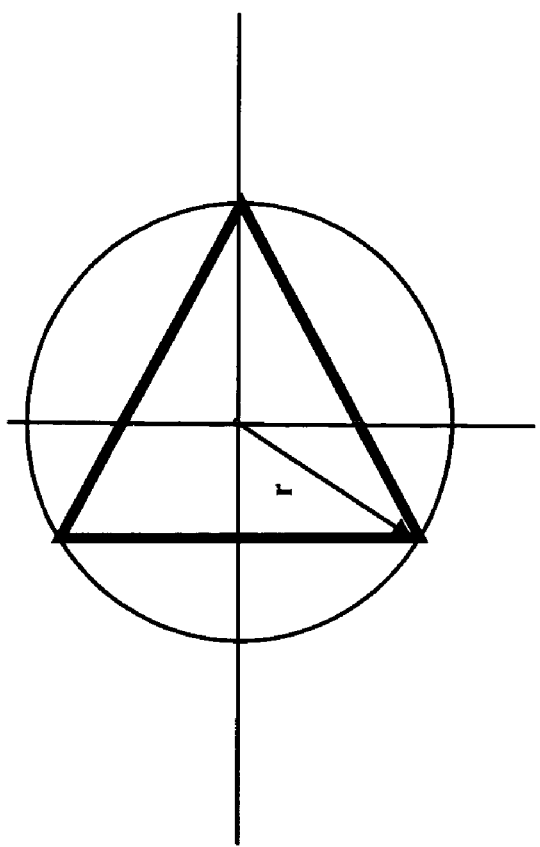
FIG. 12B shows an equilateral triangle-shaped object inscribed in a circle of radius r=25 m.
Figure 12A:
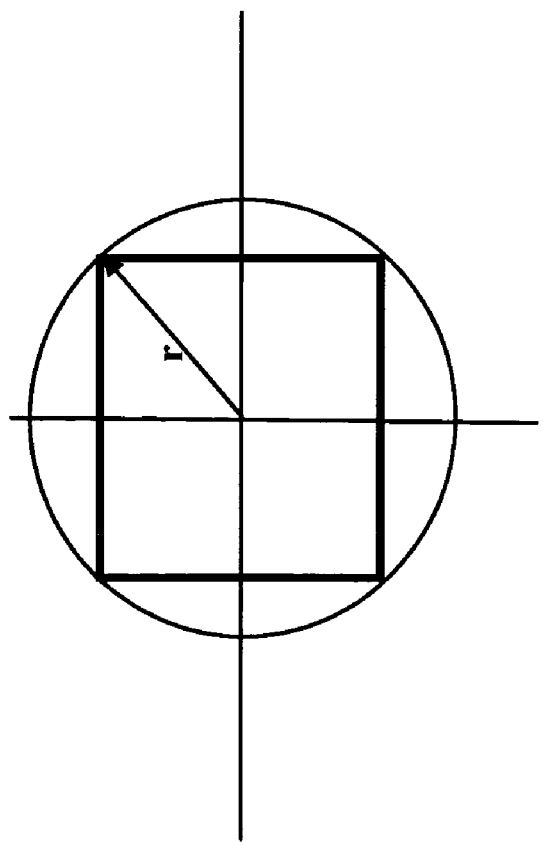
FIG. 12A shows a square-shaped object inscribed in a circle of radius 25 m.

The two-dimensional GIP image can be used to discriminate between targets in a strong clutter environment. For illustration, FIG. 12 shows a square-shaped (FIG. 12A) and an equilateral triangle-shaped (FIG. 12B) object, respectively. Both objects are assumed to be conductive, wire-type objects of size such that they can be inscribed within a ring of radius r=25 m. Assume that the object is located on the ground in the broadside of an airborne radar, which is moving in parallel with the one lateral of the object (two for the square-shaped object).

Figures 13A, 13B:
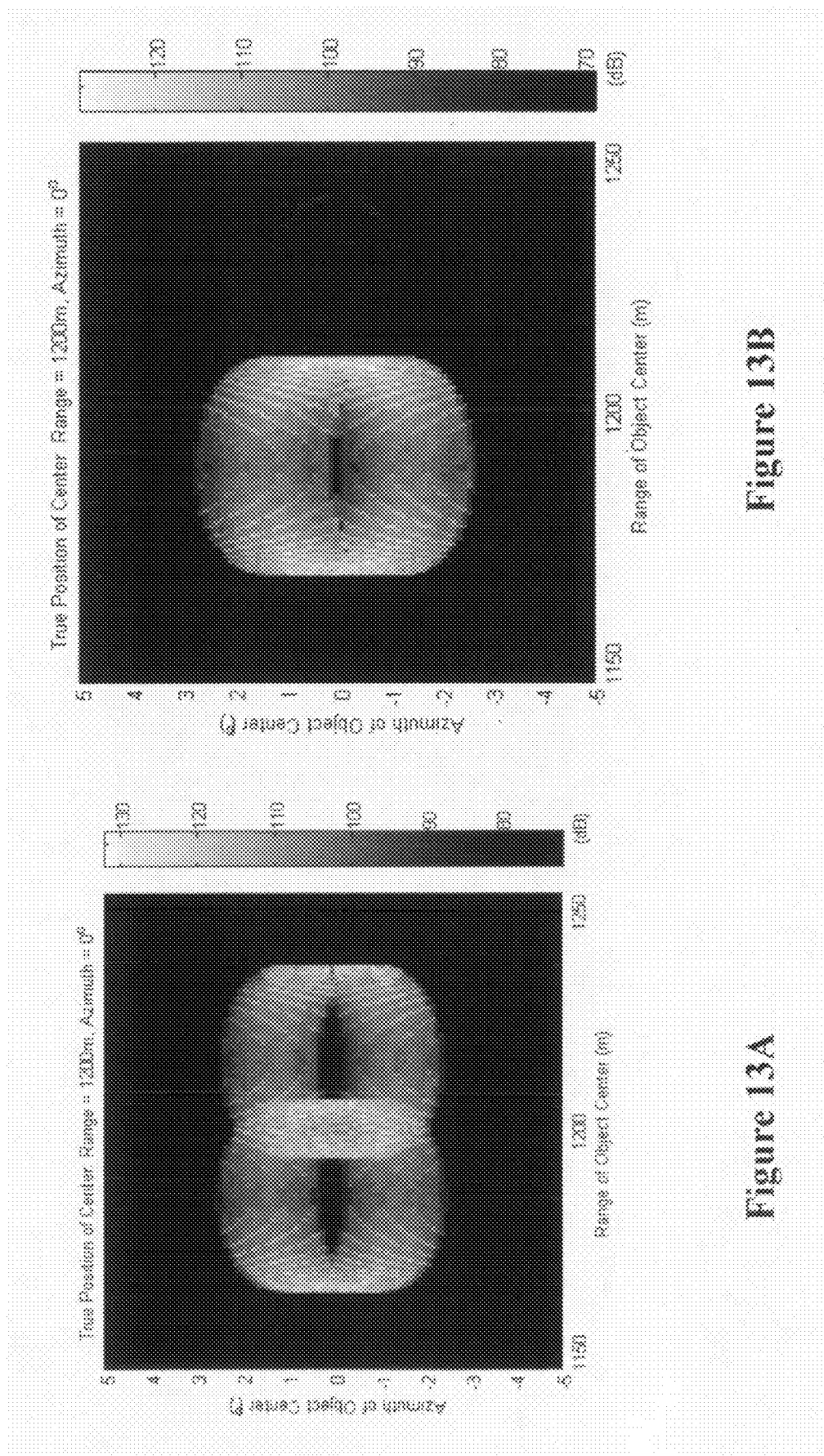
FIG. 13A shows the range-azimuth GIP of the square-shaped target when the template is a ring of radius r=25 m.
FIG. 13B shows the range-azimuth GIP of the triangle-shaped target when the template is a ring of radius r=25 m.

Assume that the target of interest is a wire-type object with unknown shape. A standard template (in this case, a ring) will be used in the GIP detector/discriminator. FIG. 13 depicts the range-azimuth GIP images for the square (FIG. 13A) and triangle (FIG. 13B) targets, respectively, with the template being a ring of radius r=25 m. The significant difference between the GIP images in FIG. 13A, FIG. 13B, and FIG. 9A makes the two-dimensional GIP a powerful candidate for automatic discrimination of targets in strong ground clutter.

Figures 14A, 14B:
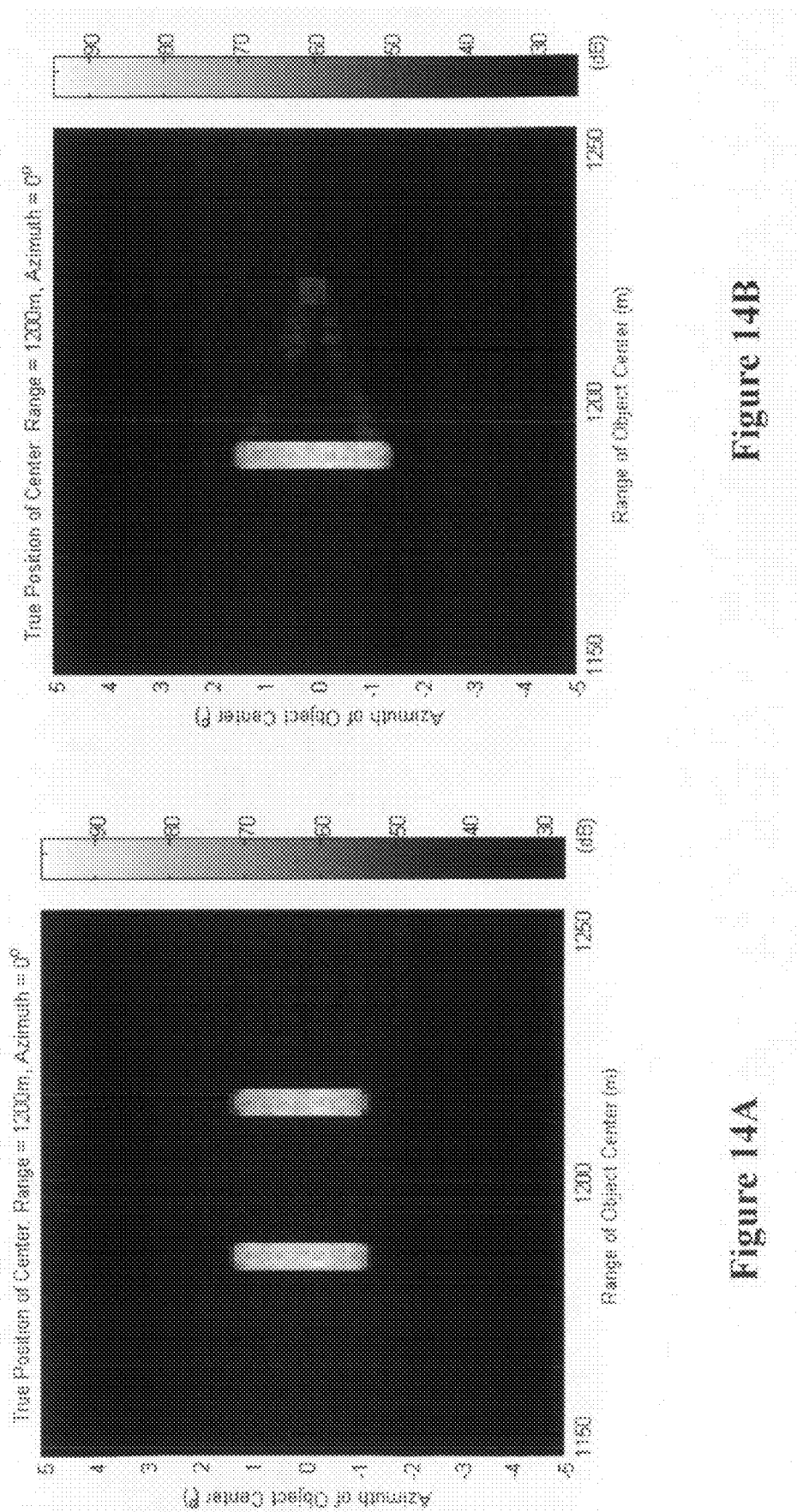
FIG. 14A shows the range-azimuth GIP of the square-shaped target when the template is a ring of radius r=2.5 m.
FIG. 14B shows the range-azimuth GIP of the triangle-shaped target when the template is a ring of radius r=2.5 m.

FIG. 14 further depicts the range-azimuth GIP images for the square (FIG. 14A) and triangle (FIG. 14B) targets, respectively, with the template being a small ring of radius r=2.5 m. Just as seen in FIG. 11B, the range-azimuth GIP images with a small template display the true center positions of targets and their rough shapes.

Furthermore, the two-dimensional GIP images can be used for discrimination between targets with the same shape but different radar reflectivity. To illustrate this, a target model is designed. The target is also assumed to be a square-shaped object that can be inscribed in a circle with r=25 m, as shown in FIG. 15A. The radar parameters and object location are the same as described in the last example. The object is modeled by discretes. Assume that each edge or literal includes $N_d$ uniformly distributed discretes. All discretes on one literal have the same radar cross-section (RCS), and may have different RCS from those on another literal. Specifically, denote the discrete RCS on each of four literals as $\sigma_1$, $\sigma_2$, $\sigma_3$, and $\sigma_4$, respectively.

Assume that each literal includes $N_d$=60 discretes. The following 4 cases are designed for comparison:

Case 1: $\sigma_1=\sigma_2=\sigma_3\sigma_4=0.5$ m$^2$.
Case 2: $\sigma_1=3\sigma_2=10\ \sigma_3=40\sigma_4=0.5$ m$^2$
Case 3: $\sigma_1=10\sigma_2=100\sigma_3=1000\sigma_4=0.5$ m$^2$
Case 4: $\sigma_1=1000\sigma_2=1000\sigma_3=1000\sigma_4=0.5$ m$^2$.

In Case 1, all discretes on all four literals have the same RCS. In Case 2 and Case 3, the discrete RCS decreases gradually from literal to literal. But the decrement is much smaller in Case 2 than in Case 3. In Case 4, the discrete RCS on one literal (in parallel to the radar moving track) is stronger than those on the other three literals (equally small) by 30 dB. The clutter background is assumed to be farm land. One CPI includes 1024 pulses. The square object spreads over 17 Doppler cells and 52 range bins, a total of 134 range-Doppler cells, as shown in FIG. 15B. Because the resolution in cross range is lower than that in slant range in this example, the two literals in parallel to the moving radar spread fewer range-Doppler cells (each includes more discretes) than other two literals.

Figure 16:
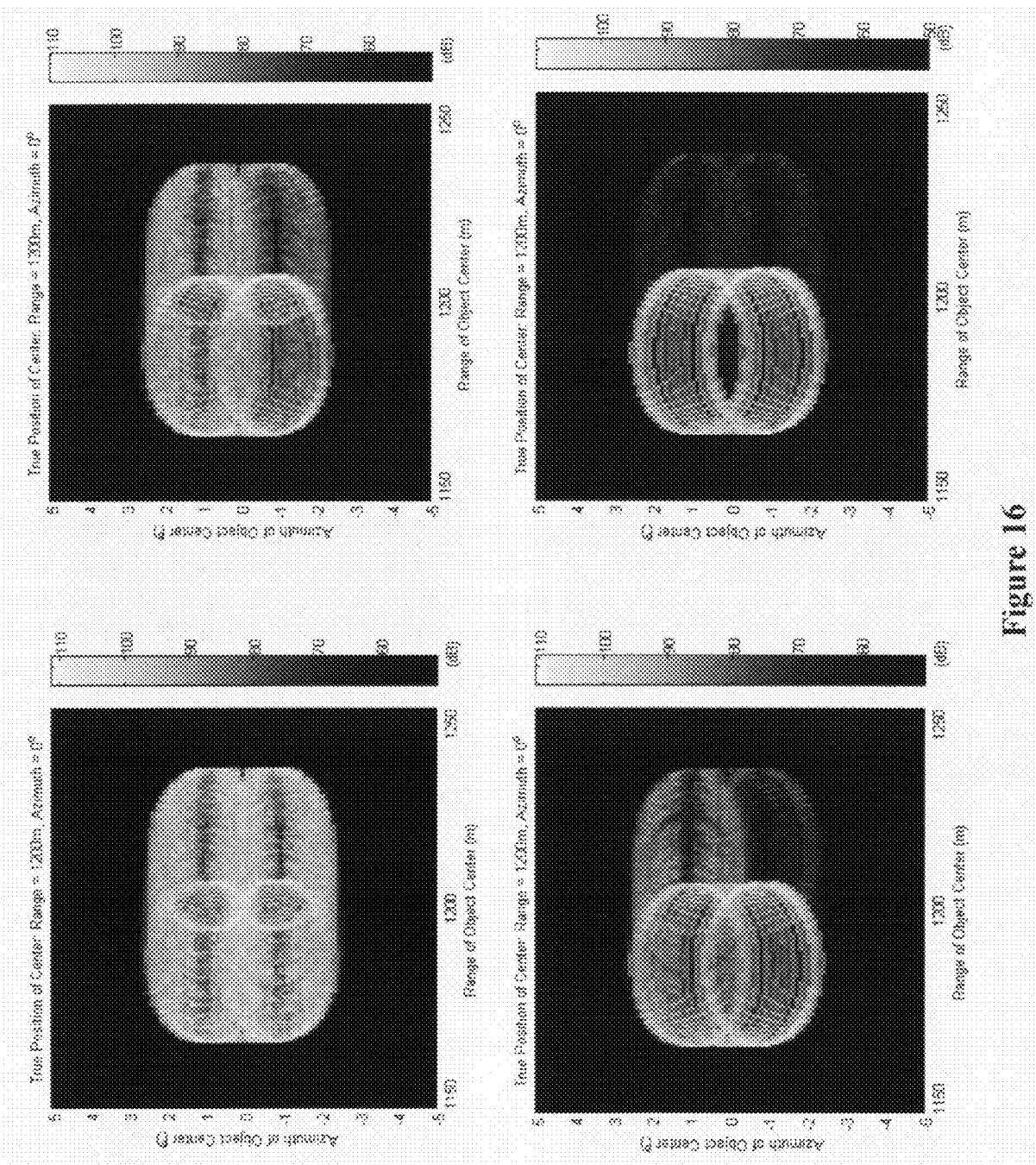
FIG. 16 compares the range-azimuth GIP images in the four cases with the square-shaped object when the template is a ring of radius r=25 m.

FIG. 16 depicts the range-azimuth GIP images with the template being a ring of radius r=25 m, for the four cases, respectively. It is shown that the GIP images in different cases are significantly different. Therefore, the two-dimensional GIP images can be used for target discrimination even though the targets have similar shape.

The generalized inner product method and apparatus of the present invention improves the detection and discrimination of slow moving or stationary range-Doppler spread objects on or in close proximity to the ground (or sea surface). This robust detector/discriminator separates radar returns from interference including ground clutter discretes via a coherent process for separating target returns from the myriad of received signals. Thus the apparatus and method improves the probability of detecting and declaring the presence or absence of an object at the same time that the probability of false declaration decreases. The apparatus and method can be used to improve the automatic target recognition (ATR) capabilities for over resolved targets in heavy clutter.

Though developed for airborne radar, the method and apparatus of the present invention can be applied to the processing of any over resolved object(s) in fields other than radar, including other sensors. For example but not as a limitation, the present invention may be applied to sonar, X-ray, ultrasound, or other techniques of medical imaging and industrial inspection which may be improved by the method and apparatus of the present invention.

Clearly, many modifications and variations of the present invention are possible in light of the above description, and it is therefore understood, within the inventive scope of the inventive concept, that the invention may be practiced otherwise than specifically claimed.

What is claimed is:

1. Apparatus for detecting and discriminating fixed and slow moving objects in clutter, comprising:
   a radar receive channel capable of receiving a radar pulse;
   a preprocessor for
      converting said radar pulse to an intermediate frequency pulse;
      sampling said intermediate frequency pulse to yield a digital representation thereof;
      processing said digital representation so as to extract range-pulse data; and
      recording said digital representation over one coherent processing interval;
   a buffer memory for storing said recorded digital representation as a range-pulse data matrix;
   a weighted discrete Fourier transformer for converting said range-pulse data matrix to a range-Doppler data matrix;
   a pre-store memory for maintaining a database of target templates;
   a range-Doppler index calculator for calculating the range-Doppler indices for each said target template;
   a generalized inner product tester for composing and outputting an image formed from said range-Doppler indices and said range-Doppler data matrix; and
   a detector/discriminator for determining the existence of a target and its geometric parameters from said image.

2. The apparatus of claim 1, wherein said generalized inner product tester further comprises:
   means for separating said range-Doppler data matrix into:
      range-Doppler data corresponding to a coherent processing interval under test; and
      historical range-Doppler data lacking target detections;
   means for forming a data vector under test from:
      said range-Doppler data corresponding to a coherent processing interval under test; and
      range-Doppler indices for each said target template;
   a memory buffer for storing said formed data vector;
   means for forming a training data vector from:
      said historical range-Doppler data lacking target detections; and
      range-Doppler indices for each said target template;
   a memory buffer for storing said formed training data vector;
   a covariance estimator for forming a covariance matrix from said formed training data vector;
   means for computing a generalized inner product from said covariance matrix and said data vector under test; and
   a memory buffer for storing said computed generalized inner product.

3. The apparatus of claim 2, wherein said extracted range-pulse data, received in one coherent processing interval for K range cells, is represented by the matrix:

$$X = [x_1\ x_2\ \ldots\ x_K];$$

where $$x_k = t_k + c_k + n_k;$$

$$x_k = \begin{bmatrix} x_k(1) \\ x_k(2) \\ \vdots \\ x_k(N) \end{bmatrix};$$

$$t_k = \begin{bmatrix} t_k(1) \\ t_k(2) \\ \vdots \\ t_k(N) \end{bmatrix};$$

$$c_k = \begin{bmatrix} c_k(1) \\ c_k(2) \\ \vdots \\ c_k(N) \end{bmatrix};$$

$$n_k = \begin{bmatrix} n_k(1) \\ n_k(2) \\ \vdots \\ n_k(N) \end{bmatrix};$$

and
where
   $\{t_k(n)\}$ denotes a target signal;
   $\{c_k(n)\}$ denotes surface clutter; and
   $\{n_k(n)\}$ denotes noise components.

4. The apparatus of claim 3 wherein said database of target templates stored in said pre-store memory comprises:
   a plurality of target templates further comprising the structure and shape of each target of interest;
   a plurality of standardized target templates comprising circular ring templates and circular disk templates;
   wherein each of said plurality of targets is large enough so as to cause a range-Doppler spectrum to be spread over multiple range-Doppler cells.

5. The apparatus of claim 4, wherein said database of target templates stored in said pre-store memory comprises said range-Doppler indices of each of said plurality of target templates and standardized target templates.

6. The apparatus of claim 5, wherein said range-Doppler index calculator further comprises means for calculating said range-Doppler indices for each target template in real-time or off-line.

7. The apparatus of claim 6, wherein said range-Doppler indices comprise:
   target parameters comprising position, size, orientation, and radial speed; and
   radar and platform parameters comprising wavelength, speed, and altitude.

8. The apparatus of claim 7 for detecting and discriminating fixed and slow moving objects in clutter comprises a mobile radar.

9. The apparatus of claim 8, wherein said mobile radar comprises an airborne radar.

10. The apparatus of claim 9, wherein said airborne radar is a coherent, pulse-Doppler radar.

11. Method for detecting and discriminating fixed and slow moving objects in clutter, comprising the steps of:
   receiving a radar pulse;
   preprocessing said radar pulse, said preprocessing further comprising the steps of:
      converting said radar pulse to an intermediate frequency pulse;
      sampling said intermediate frequency pulse to yield a digital representation thereof;
      processing said digital representation so as to extract range-pulse data; and
      recording said digital representation over one coherent processing interval;
   storing said recorded digital representation as a range-pulse data matrix in a buffer memory;
   converting said range-pulse data matrix to a range-Doppler data matrix through a weighted discrete Fourier transformer;
   maintaining a database of target templates in a pre-store memory;
   calculating the range-Doppler indices for each said target template in a range-Doppler index calculator;
   composing and outputting an image formed from said range-Doppler indices and said range-Doppler data matrix by performing a generalized inner product test; and
   determining the existence of a target and its geometric parameters from said image using a detector/discriminator.

12. The method of claim 11, wherein said step of performing a generalized inner product test further comprises the steps of:
   separating said range-Doppler data matrix into:
      range-Doppler data corresponding to a coherent processing interval under test; and
      historical range-Doppler data lacking target detections;
   forming a data vector under test from:
      said range-Doppler data corresponding to a coherent processing interval under test; and
      range-Doppler indices for each said target template;
   storing said formed data vector in a memory buffer;
   forming a training data vector from:
      said historical range-Doppler data lacking target detections; and
      range-Doppler indices for each said target template;
   storing said formed training data vector in a memory buffer;
   forming a covariance matrix from said formed training data vector by performing a covariance estimation;
   computing a generalized inner product from said covariance matrix and said data vector under test; and
   storing said computed generalized inner product in a memory buffer.

13. The method of claim 12, wherein said extracted range-pulse data, received in one coherent processing interval for K range cells, is represented by the matrix:
$$X = [x_1\ x_2\ \ldots\ x_K];$$
where $$x_k = t_k + c_k + n_k;$$

$$x_k = \begin{bmatrix} x_k(1) \\ x_k(2) \\ \vdots \\ x_k(N) \end{bmatrix};$$

$$t_k = \begin{bmatrix} t_k(1) \\ t_k(2) \\ \vdots \\ t_k(N) \end{bmatrix};$$

$$c_k = \begin{bmatrix} c_k(1) \\ c_k(2) \\ \vdots \\ c_k(N) \end{bmatrix};$$

$$n_k = \begin{bmatrix} n_k(1) \\ n_k(2) \\ \vdots \\ n_k(N) \end{bmatrix};$$

and
where
   $\{t_k(n)\}$ denotes a target signal;
   $\{c_k(n)\}$ denotes surface clutter; and
   $\{n_k(n)\}$ denotes noise components.

14. The method of claim 13 wherein said database of target templates stored in said pre-store memory comprises:
   a plurality of target templates further comprising the structure and shape of each target of interest;
   a plurality of standardized target templates comprising circular ring templates and circular disk templates;
wherein each of said plurality of targets is large enough so as to cause a range-Doppler spectrum to be spread over multiple range-Doppler cells.

15. The method of claim 14, wherein said database of target templates stored in said pre-store memory comprises said range-Doppler indices of each of said plurality of target templates and standardized target templates.

16. The apparatus of claim 15, wherein said step of calculating range-Doppler indices further comprises the step of calculating said range-Doppler indices for each target template in real-time or off-line.

17. The method of claim 16, wherein said range-Doppler indices comprise:
   target parameters comprising position, size, orientation, and radial speed; and
   radar and platform parameters comprising wavelength, speed, and altitude.

18. The method of claim 17 wherein said radar is a mobile radar.

19. The method of claim 18, wherein said mobile radar is an airborne radar.

20. The method of claim 19, wherein said airborne radar is a coherent, pulse-Doppler radar.

* * * * *